Nov. 13, 1945.　　　　C. MUESER　　　　2,388,988
DIAPHRAGM VALVE
Filed April 7, 1944　　　　2 Sheets-Sheet 1

INVENTOR
Charles Mueser
BY
Gifford Scull & Burgess
ATTORNEYS

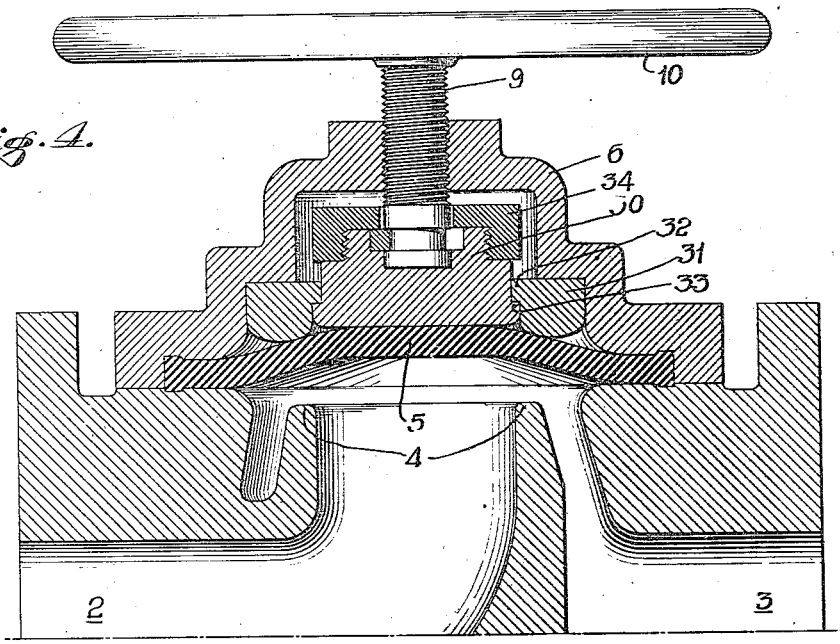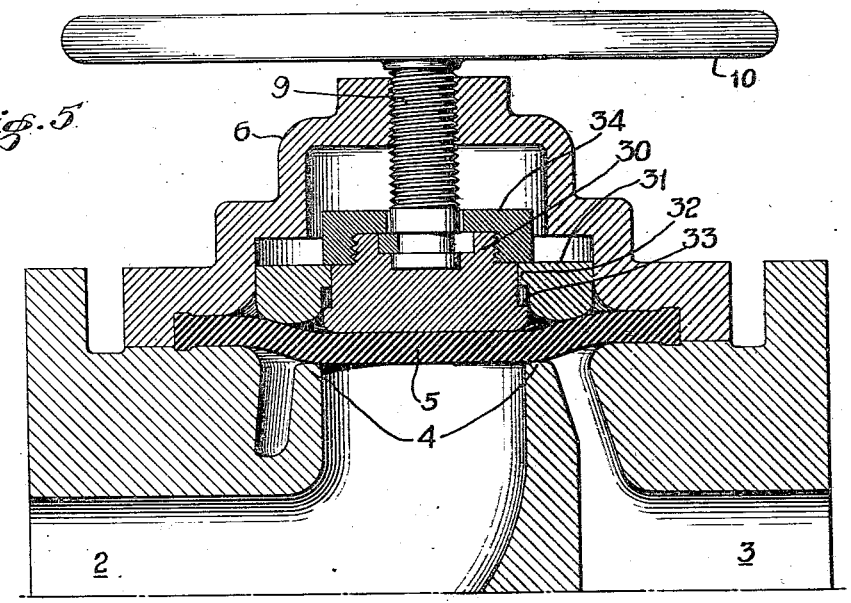

Patented Nov. 13, 1945

2,388,988

UNITED STATES PATENT OFFICE 2,388,988

DIAPHRAGM VALVE

Charles Mueser, Verona, N. J., assignor to T. Shriver & Company, Inc., Harrison, N. J., a corporation of New Jersey Application April 7, 1944, Serial No. 529,908

13 Claims. (Cl. 251—24)

The invention relates to so-called diaphragm valves, in which the flow passage is controlled not by a rigid valve head but by a flexible diaphragm adapted to move into and out of engagement with an appropriate seat incorporated in the flow passage. Such valves have numerous recognized advantages over the rigid type valve, especially for certain types of work.

The principal object of the present invention is to provide a valve of this character which is particularly smooth in action and so organized as to protect and insure a long life for the diaphragm. This is accomplished, in general, by providing a plurality of concentric, relatively movable backing members adapted to engage concentric portions of the back of the diaphragm, and manually operable means whereby the backing members are, or may be, all maintained in contact with the back of the diaphragm throughout its closing and opening movements, such means imparting differential motion to the respective members so that each advances a distance commensurate with the travel in moving from one extreme position to the other of that part of the diaphragm which it engages. By this means the diaphragm can be relieved of any tendency to flutter and of undue strains incident to distortion caused by the pressure of the medium in the flow passage. Also, a tight seal of the flow passage in the closed position of the diaphragm is achieved without requiring excessive effort on the part of the operator or excessive and wear-inducing clamping of the diaphragm against its seat.

Figure 3:
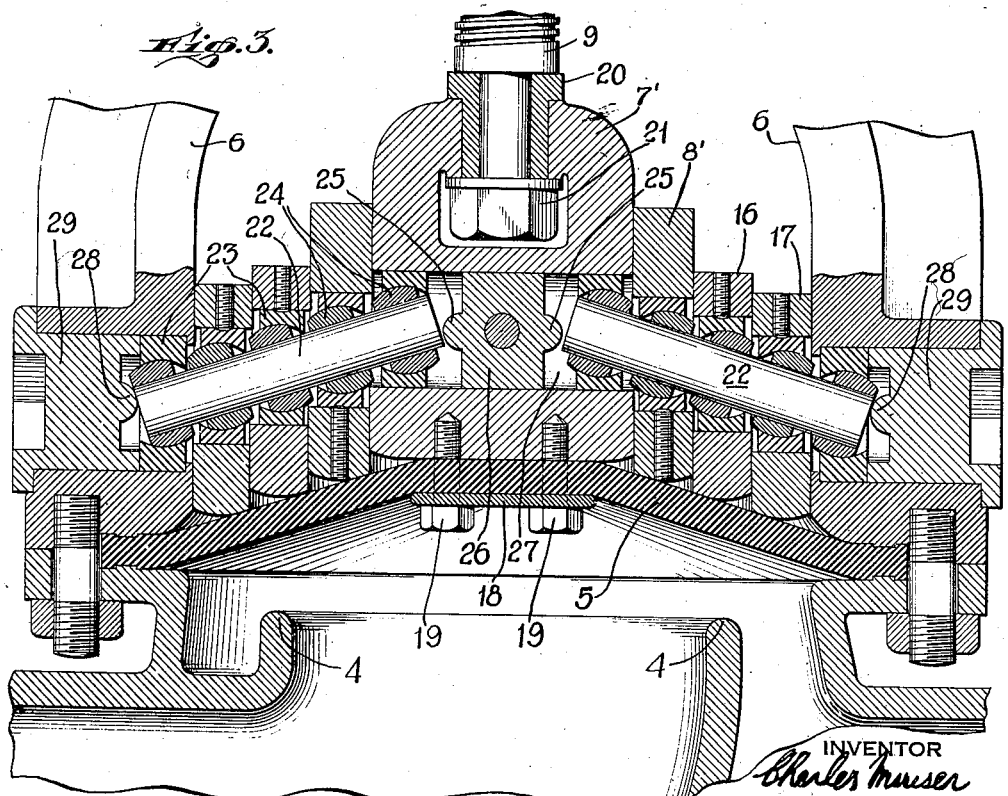

These and other advantages of the invention will be apparent from the illustrative structures described below and shown in the accompanying drawings, Figs. 1 and 2 of the latter being somewhat diagrammatic sectional views showing a valve constructed in accordance with the invention and illustrating the valve in its open and closed positions, respectively; Fig. 3 is a larger scale sectional view of a preferred form of large size valve suitable, for example, for diaphragms of a diameter of 6" and over; and Figs. 4 and 5 are sectional views showing the open and closed positions, respectively, of another form of differential actuating mechanism.

Figures 1, 2:
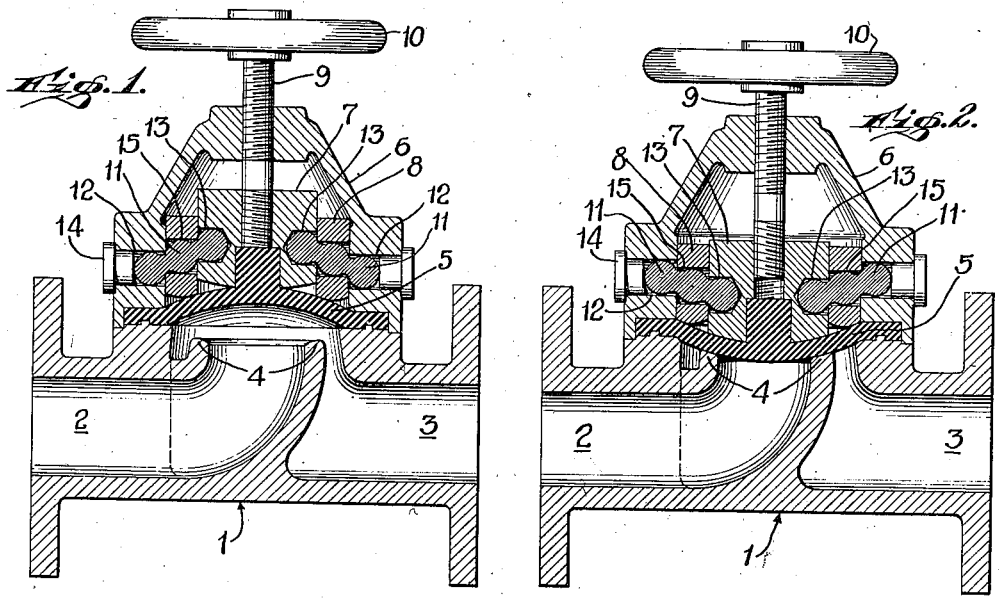

Referring first to the form of the invention illustrated in Figs. 1 and 2, the valve comprises a hollow body 1 having a flow passage, of which the inlet and outlet are marked 2 and 3, respectively, and incorporating an upstanding seat 4. In accordance with the invention this seat may be, and preferably is, of annular form with its central aperture quite unobstructed and of a diameter substantially equal to the maximum diameter of the flow passage. Mounted above the seat and extending across the open top of the valve body is a diaphragm 5 which is adapted to be flexed into and out of sealing engagement with seat 4 to close and open the flow passage.

As shown, the over-all diameter of the diaphragm is considerably greater than that of seat 4 and the outer, marginal portion of the diaphragm is clamped to the top of the valve body, as by bonnet 6, at such a distance from the seat that an annular portion of the diaphragm outside the bounds of the seat is free to flex.

Engaging the upper face of the diaphragm are a number of concentric backing members, consisting in this instance of a main or central backing member 7 encircled by an auxiliary annular backing member 8, the latter engaging the annular portion of the diaphragm intermediate its clamped edge and seat 4. These members are relatively movable in a direction normal to the diaphragm and are conveniently dimensioned to have a sliding fit upon one another and within the bonnet 6. Also, means are preferably provided for holding the backing members against rotation within the bonnet, although as will presently appear, this function may be performed by the actuating mechanism. Incidentally, it may be stated at this juncture that the terms "diameter," "concentric," "annular," etc., are not used herein as words of limitation to confine the respective parts to such as are truly circular, as, obviously, other appropriate shapes, such as regular polygons, will serve equally well.

The primary function of the members 7 and 8 is to apply pressure to the back of the diaphragm to flex it downwardly into engagement with seat 4 to close the flow passage, and to do this by advancing the central and outer portions of the diaphragm different distances commensurate with the different travel required of such portions to effect a close seal with the seat without undue distortion of any part of the diaphragm. Conversely, the members 7 and 8 are adapted to be withdrawn in similar fashion so as to provide a uniform backing or support for the diaphragm against undue distortion of any part of it under the pressure of the medium flowing through the valve when the same is open. To this end there is provided a suitable actuating stem 9 mounted in the bonnet and surmounted by a hand wheel 10, together with means responsive to the rotation of the actuating stem to effect the described differential movements of the backing members.

In this form the upper portion of the stem is shown threaded in the top of the bonnet and the lower end of the stem provided with an opposite-handed threaded portion engaging a threaded opening in member 7, so that the latter is raised and lowered a full stroke with a minimum number of turns of the hand wheel; and the outer backing member 8 is arranged to be actuated by member 7. This is accomplished by means of a number of links 11 which are pivotally supported at their outer ends, as in the openings 12 in bonnet 6, and extend radially between the bonnet and the central backing member 7 in which they seat in openings 13. The openings 12 in the bonnet can be closed by suitable plugs 14. The mid-portion of each link seats in an opening 15 in, or otherwise engages, the outer backing member 8, so that as the links swing up and down about their outer pivoted ends in response to raising and lowering of the central backing member, the outer backing member is likewise raised and lowered but, of course, to a lesser extent. The relative positions of the parts referred to are clearly shown in Figs. 1 and 2 in the open and closed positions of the valve, respectively.

In Fig. 3 the structure above outlined is shown elaborated in a form suitable for large size valves, there being a main or central backing member 7' surrounded by concentric annular backing members 8', 16 and 17 all mounted, as before, within bonnet 6. Preferably, also, diaphragm 5 is rigidly secured to the main backing member, as by clamping plate 18 and bolts 19. The actuating stem 9 is secured to member 7' with freedom to rotate relatively to it, as by sleeve 20 and clamping nut 21.

The actuating links in this form consist of floating bars 22 which are supported throughout their length in each of the backing members and in the wall of the bonnet by identical ball joints consisting of stationary socket members 23 and ball members 24. Projections 25 on block 26 mounted in the bore 27 of the central backing member serve as inner end stops for bars 22, and corresponding outer end stops are provided by projections 28 on plugs 29.

The diaphragm is thus closely and accurately controlled in its flexing movements toward and from seat 4; and, as will be apparent, by appropriate setting of the backing elements in relation to the seat, a slight wrap-around of the diaphragm against the seat can be achieved, under close control, if the character of the material of the diaphragm or other conditions are such as to make that desirable.

In the structure illustrated in Figs. 4 and 5 the differential movements of the backing members are effected by means of a form of lost-motion drive connection, the stem actuating the main or central backing member and the latter, through said drive connection, actuating the outer backing member. Again, the corresponding major elements are similarly numbered.

In this form, two concentric backing members are shown, namely, a central member 30 which is mounted on the lower end of stem 9, and an outer member 31. The latter is provided with an inwardly projecting rib 32 which overlies a corresponding outwardly projecting rib 33 on the lower end of member 30. A clamp ring 34 threaded on the upper end of member 30 serves as a stop to limit the upward movement of member 31 relative to member 30.

As will be seen, rotation of the stem 9 by hand wheel 10 in one direction lowers the central backing member, and the latter, through the engagement of clamp ring 34 with rib 32, forces the outer backing member down to the position shown in Fig. 5. Rotation of the stem in the other direction raises the central backing member, and the latter, through the engagement of its rib 33 with rib 32, raises the outer backing member to the position shown in Fig. 4. Thus, in both the full open and full closed positions of the valve, the diaphragm is sustained just as in the previously described constructions; in the intermediate positions the diaphragm is under the control of the main or central backing member. This arrangement, while lacking the positive control of the entire diaphragm in all its positions, is adequate for valves of relatively small size and where the pressures of the medium controlled by the valve are not excessive. As will be understood, the diaphragm may be connected with the central backing member to effect a positive withdrawal or upward movement of the diaphragm if it is not desired to rely for this purpose on the pressure of the fluid acting on the diaphragm.

While only certain illustrative forms of the invention have been shown and described, it will be recognized that the general principles involved are capable of embodiment in numerous forms within the scope of the appended claims. Other types of differential control within the broadest aspects of this invention are shown, for example, in copending application, Serial No. 530,144, filed April 8, 1944.

The following is claimed:

1. In a valve, the combination with a flow passage including a seat, and a diaphragm, having a central portion surrounded by an annular portion, adapted to be flexed into and out of engagement with the seat to close and open the flow passage, the central portion of said diaphragm having a greater travel to said seat than the annular portion, of a backing member engaging the central portion only of the diaphragm on the side remote from the seat, a manually operable stem rotatable to advance said backing member a distance commensurate with the travel of the central portion of the diaphragm in moving from open to closed position, an annular member surrounding the backing member and engaging the annular portion of the diaphragm surrounding the said central portion thereof, said backing member and said annular member each being movable with respect to the other, and means responsive to rotation of said stem to advance said annular member a distance commensurate with the lesser travel of said annular portion of the diaphragm.

2. In a valve, the combination with a flow passage including a seat, and a diaphragm, having a central portion surrounded by an annular portion, adapted to be flexed into and out of engagement with the seat to close and open the flow passage, the central portion of said diaphragm having a greater travel to said seat than the annular portion, of a backing member engaging the central portion only of the diaphragm on the side remote from the seat, a manually operable stem rotatable to advance said backing member a distance commensurate with the travel of the central portion of the diaphragm in moving from open to closed position, an annular member surrounding the backing member and engaging the annular portion of the diaphragm surrounding the said central portion thereof, said backing member and said annular member each being movable with respect to the other, and means actuated by said backing member to advance said annular member a distance commensurate with the lesser travel of said annular portion of the diaphragm.

3. In a valve, the combination with a flow passage including a seat, and a diaphragm adapted to be flexed into and out of engagement with the seat to close and open the flow passage, and of a diameter, relative to the diameter of the seat, such that an annular portion of the diaphragm outside the bounds of the seat is free to flex, of a main backing member engaging the central portion only of the diaphragm on the side remote from the seat, a manually operable stem rotatable to advance the backing member a distance commensurate with the travel of the central portion of the diaphragm in moving from open to closed position, an auxiliary backing member movable relatively to the main backing member and adapted to engage the said annular portion of the diaphragm outside the bounds of the seat, and means responsive to rotation of said stem to advance the auxiliary backing member a distance commensurate with the lesser travel of the said annular portion of the diaphragm.

4. In a valve, the combination with a flow passage including a seat, and a diaphragm adapted to be flexed into and out of engagement with the seat to close and open the flow passage, and of a diameter, relative to the diameter of the seat, such that an annular portion of the diaphragm outside the bounds of the seat is free to flex, of a main backing member engaging the central portion only of the diaphragm on the side remote from the seat, a manually operable stem rotatable to advance the backing member a distance commensurate with the travel of the central portion of the diaphragm in moving from open to closed position, an auxiliary backing member movable relatively to the main backing member and adapted to engage the said annular portion of the diaphragm outside the bounds of the seat, and differential actuating means responsive to rotation of the stem and adapted to advance the auxiliary backing member a lesser distance than the main backing member.

5. In a valve, the combination with a flow passage including a seat, and a diaphragm adapted to be flexed into and out of engagement with the seat to close and open the flow passage, and of a diameter, relative to the diameter of the seat, such that an annular portion of the diaphragm outside the bounds of the seat is free to flex, of a main backing member engaging the central portion only of the diaphragm on the side remote from the seat, a manually operable stem rotatable to advance the backing member a distance commensurate with the travel of the central portion of the diaphragm in moving from open to closed position, an auxiliary backing member movable relatively to the main backing member and adapted to engage the said annular portion of the diaphragm outside the bounds of the seat, and lost-motion actuating means operated by said main backing member and adapted to advance the auxiliary backing member a lesser distance than the main backing member.

6. In a valve, the combination with a flow passage including a seat, and a diaphragm adapted to be flexed into and out of engagement with the seat to close and open the flow passage, and of a diameter, relative to the diameter of the seat, such that an annular portion of the diaphragm outside the bounds of the seat is free to flex, of a main backing member engaging the central portion only of the diaphragm on the side remote from the seat, a stationary support, a stem rotatable to advance the backing member a distance commensurate with the travel of the central portion of the diaphragm in moving from open to closed position, an auxiliary backing member movable relatively to the main backing member and adapted to engage the said annular portion of the diaphragm outside the bounds of the seat, and differential actuating means extending between the stationary support and the main backing member and adapted to advance the auxiliary backing member a distance commensurate with the lesser travel of the said annular portion of the diaphragm.

7. In a valve, the combination with a flow passage including a seat, and a diaphragm adapted to be flexed into and out of engagement with the seat to close and open the flow passage, of two relatively movable, concentric backing members respectively engaging concentric portions of the back of the diaphragm, means for moving one of said members a distance commensurate with the travel in moving from open to closed position of that portion of the diaphragm which such member engages and means actuated by such member to move the other member a distance commensurate with the travel in moving from open to closed position of that portion of the diaphragm which such other member engages.

8. In a valve, the combination with a flow passage including a seat, and a diaphragm adapted to be flexed into and out of engagement with the seat to close and open the flow passage, of a bonnet, inner and outer concentric backing members within the bonnet and respectively engaging concentric portions of the back of the diaphragm, radially disposed links pivotally mounted at their respective ends in the bonnet and in the inner concentric backing member and engaging the outer concentric backing member, and a stem rotatable in the bonnet and adapted to move one of said members a distance commensurate with the travel in moving from open to closed position of that portion of the diaphragm which such member engages, and, through said links, adapted to move the other of said members a distance commensurate with the travel in moving from open to closed position of that portion of the diaphragm which such other member engages.

9. In a valve, the combination with a flow passage including a seat, and a diaphragm adapted to be flexed into and out of engagement with the seat to close and open the flow passage, and of a diameter, relative to the diameter of the seat, such that an annular portion of the diaphragm outside the bounds of the seat is free to flex, of a main backing member engaging the central portion only of the diaphragm on the side remote from the seat, a bonnet, a stem rotatable in the bonnet to advance the backing member a distance commensurate with the travel of the central portion of the diaphragm in moving from open to closed position, an auxiliary backing member movable relatively to the main backing member and adapted to engage the said annular portion of the diaphragm outside the bounds of the seat, and link means extending between the bonnet and the main backing member and engaging the auxiliary backing member to advance the same a distance commensurate with the lesser travel of the said annular portion of the diaphragm.

10. In a valve, the combination with a valve body having a flow passage, of an annular seat located in said passage and having an unobstructed aperture therethrough of a diameter substantially equal to the maximum diameter of the flow passage, a diaphragm mounted on the body and adapted to be flexed into and out of engagement with said seat to open and close the flow passage, relatively movable concentric backing members engaging the diaphragm on the side remote from the seat and differential actuating means for said members adapted to advance and withdraw the same in a direction normal to the plane of said seat.

11. In a valve, the combination with a valve body having a flow passage, of an annular seat located in said passage and having an unobstructed aperture therethrough of a diameter substantially equal to the maximum diameter of the flow passage, a diaphragm mounted on the body and adapted to be flexed into and out of engagement with said seat to open and close the flow passage, relatively movable concentric backing members engaging the diaphragm on the side remote from the seat, means for advancing and withdrawing one of said members in a direction normal to the plane of said seat to flex the central portion of the diaphragm, and a lost-motion connection between said member and an outer concentric member to advance the latter a lesser distance than the first-mentioned member.

12. In a valve, the combination with a valve body having a flow passage, of an annular seat located in said passage and having an unobstructed aperture therethrough of a diameter substantially equal to the maximum diameter of the flow passage, a diaphragm mounted on the body and adapted to be flexed into and out of engagement with said seat to open and close the flow passage, relatively movable concentric backing members engaging the diaphragm on the side remote from the seat, means for advancing and withdrawing one of said members in a direction normal to the plane of said seat to flex the central portion of the diaphragm, and a lost-motion connection between said member and an outer concentric member to advance and withdraw the latter a lesser distance than the first-mentioned member.

13. In a valve, the combination with a valve body having a flow passage, of an annular seat located in said passage and having an unobstructed aperture therethrough of a diameter substantially equal to the maximum diameter of the flow passage, a diaphragm mounted on the valve body and adapted to be flexed into and out of engagement with said seat to open and close the flow passage, concentric backing members engaging the diaphragm on the side remote from the seat, each of said members being movable with respect to the other, a bonnet, and an actuating stem having two oppositely threaded portions, one of such portions having threaded engagement with one of said members, and the other of such portions having threaded engagement with the bonnet.

CHARLES MUESER.